United States Patent [19]

De Gruyl

[11] 3,781,704

[45] Dec. 25, 1973

[54] HIGH ISOLATION CIRCULATOR ARRANGEMENT FOR LOW NOISE REFLECTION TYPE AMPLIFIERS

[75] Inventor: Johannes Albertus De Gruyl, Commack, N.Y.

[73] Assignee: Cutler-Hammer, Inc., Milwaukee, Wis.

[22] Filed: Mar. 30, 1972

[21] Appl. No.: 239,653

[52] U.S. Cl. .................................. 330/53, 330/38 M

[51] Int. Cl. .................................................. H03f 3/60

[58] Field of Search .............................. 330/53, 165; 333/1.1

[56] References Cited

UNITED STATES PATENTS

| | | | |
|---|---|---|---|
| 3,676,803 | 7/1972 | Simmons | 333/1.1 |
| 3,614,675 | 10/1971 | Konishi | 333/1.1 X |
| 3,636,452 | 1/1972 | Nuding | 333/1.1 X |
| 3,582,831 | 6/1971 | Siekanowicz et al. | 333/1.1 |
| 3,477,028 | 11/1969 | Aslaksen | 325/446 |

*Primary Examiner*—Nathan Kaufman
*Attorney*—Henry Huff

[57] ABSTRACT

A multi-junction cascade circulator includes an inter-junction tuning device to enable operation of a reflection type amplifier with only one pass of input isolation, thereby minimizing degradation of signal to noise ratio due to input circuit losses while maintaining high isolation between the input and output of the amplifier independent of the load conditions.

3 Claims, 2 Drawing Figures

HIGH ISOLATION CIRCULATOR ARRANGEMENT FOR LOW NOISE REFLECTION TYPE AMPLIFIERS

BACKGROUND

This invention relates to improvement in circulators, particularly although not exclusively for use with single-port microwave amplifiers, such as low noise parametric amplifiers.

Circulators are non-reciprocal microwave devices having generally three or more ports that are intercoupled by way of a body of magnetically biased ferrite material so that an input applied to one port will appear as output at a second port only, input to the second port will appear as output at a third but not at the first, and so on.

In the parametric amplifier application of a three-port circulator, the input signal to be amplified is applied to a first port, the amplifier is coupled to a second port, and the amplified output appears at the third port, which is coupled to the signal load or utilization means. Ideally, the isolation between the output and input ports would be complete, allowing the combination to operate as a perfectly unilateral amplifier; in practice, however, unavoidable variations in the signal load impedance presented to the output port and/or the limited isolation of a typical circulator will cause a feedback from the amplifier output to the input port of the circulator, resulting in usually intolerable input VSWR.

Prior art practice, for achieving the higher degree of isolation required in most applications, consists of adding another circulator before the one to which the reflection amplifier (such as a parametric amplifier) is connected.

Thus, a four-port circulator is formed by interconnecting two three-port circulators, leaving four available ports. Three of these ports serve as input port, amplifier port, and output port respectively. The fourth port, terminated in a matched dissipative termination, provides the necessary extra isolation between the amplifier output and the input port. However, the drawback of this arrangement is that the input signal must pass an additional circulator before entering the amplifier.

Any realizable circulator exhibits some forward loss, i.e., loss in the transmission of signals in the desired direction, accompanied by a corresponding amount of thermal noise. The additional circulator preceding the amplifier introduces additional noise at the input which is amplified along with the desired signal, thereby degrading the low noise properties of the basic amplifier.

Cascaded circulator arrangements, usually integrated in one housing, are called N-port circulators, where N is the number of externally available ports provided by the assemblage. An N-port circulator can be formed by cascading (N—2) three-port circulators. The elemental three-port circulators are generally referred to simply as junctions, and the connections between them as injunctions. Transfer of a signal through a circulator from one port to the next adjacent port is called a "pass." The isolation between the $(n-1)$th and $(n+1)$th port will be referred to as the isolation of the $n$th port.

SUMMARY

In theory, a simple three-port circulator could be made to operate almost ideally by precisely tuning the external dissipative termination to match the output port for maximum isolation. However, the required condition is so critical that it cannot be maintained in the presence of even very slight variations of the load impedance, such as are normal in practice.

According to this invention, the above theoretical operation, by means of a tuning device, is made practicable by introducing non-reciprocal isolation means between the signal load device and the output port of the basic circulator. This isolation means, which may typically comprise one or more circulator junctions, minimizes variations in the impedance presented to the output port of the original junction to any prespecified degree so that with the tuning device this output port can now be stably matched for maximum isolation. The parametric amplifier may then be coupled directly to the first, or basic junction, avoiding the additional input loss of an extra pass that is present in prior art systems. The result is an improvement in the system noise temperature.

DESCRIPTION OF THE PREFERRED EMBODIMENTS

Figure 1:
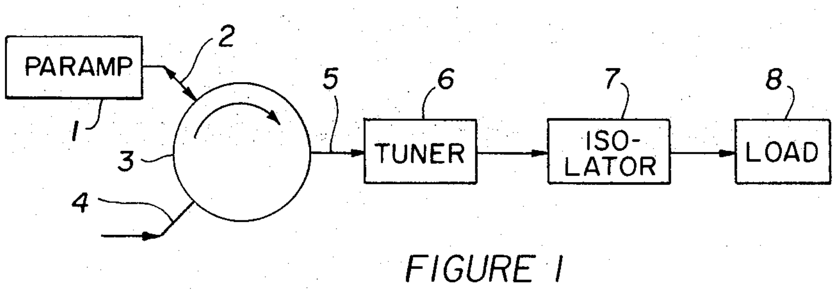
FIG. 1 is a schematic diagram generically illustrating an embodiment of the invention in a parametric amplifier system.

Referring to FIG. 1, the part 1, labelled "paramp," includes the usual variable reactance means, pump and bias sources, and associated circuit elements of a single port parametric amplifier unit. The amplifier port is connected to the port 2 of a three-port circulator 3. The port 2 is hereinafter referred to as the "active device" port, and ports 4 and 5 are referred to as the input and output ports, respectively.

The circulator output port 5 is coupled by way of a tuning device 6 and an isolator 7 to a signal load or utilization means 8 which may be, for example, a subsequent amplifier stage. The term "isolator," as used herein to characterize the device 7 of FIG. 1, is intended to mean any non-reciprocal transmission means, such as for example another circulator.

The tuner 6 is an impedance transformer of any convenient type that can be adjusted or designed to convert the impedance presented by the input port of isolator 7 to an impedance that matches the circulator output port 5 for maximum isolation.

The circulator 3, isolator 7 and load 8 are nominally designed to work at some resistive impedance level R. In practice, owing to unavoidable imperfections the circulator will generally perform best when the output port 5 is confronted by a somewhat different impedance Z, which may include a reactive component but in any event is highly critical.

If the input impedance of isolator remains essentially constant at or near the nominal value R, the tuner 6 can be designed or adjusted to transform it to the desired value Z. Actually, the impedance of load 8 may differ appreciably from the value R.

In the operation of the apparatus of FIG. 1, the isolator 7 passes the output of the amplifier of the load 8 with relatively little attenuation, but absorbs reflections from the load with relatively high attenuation or return loss.

If the return loss of the isolator 7 were infinite, the impedance looking into the input port of the isolator would be R, regardless of the actual load impedance. In practice, variations of the load impedance appear at the isolator input port as reduced in accordance with the return loss. By appropriate design of the isolator, the return loss can always be made as great as is needed to keep its input impedance constant enough to permit the required critically stable matching at the circulator output 5 by the tuner 6.

Figure 2:
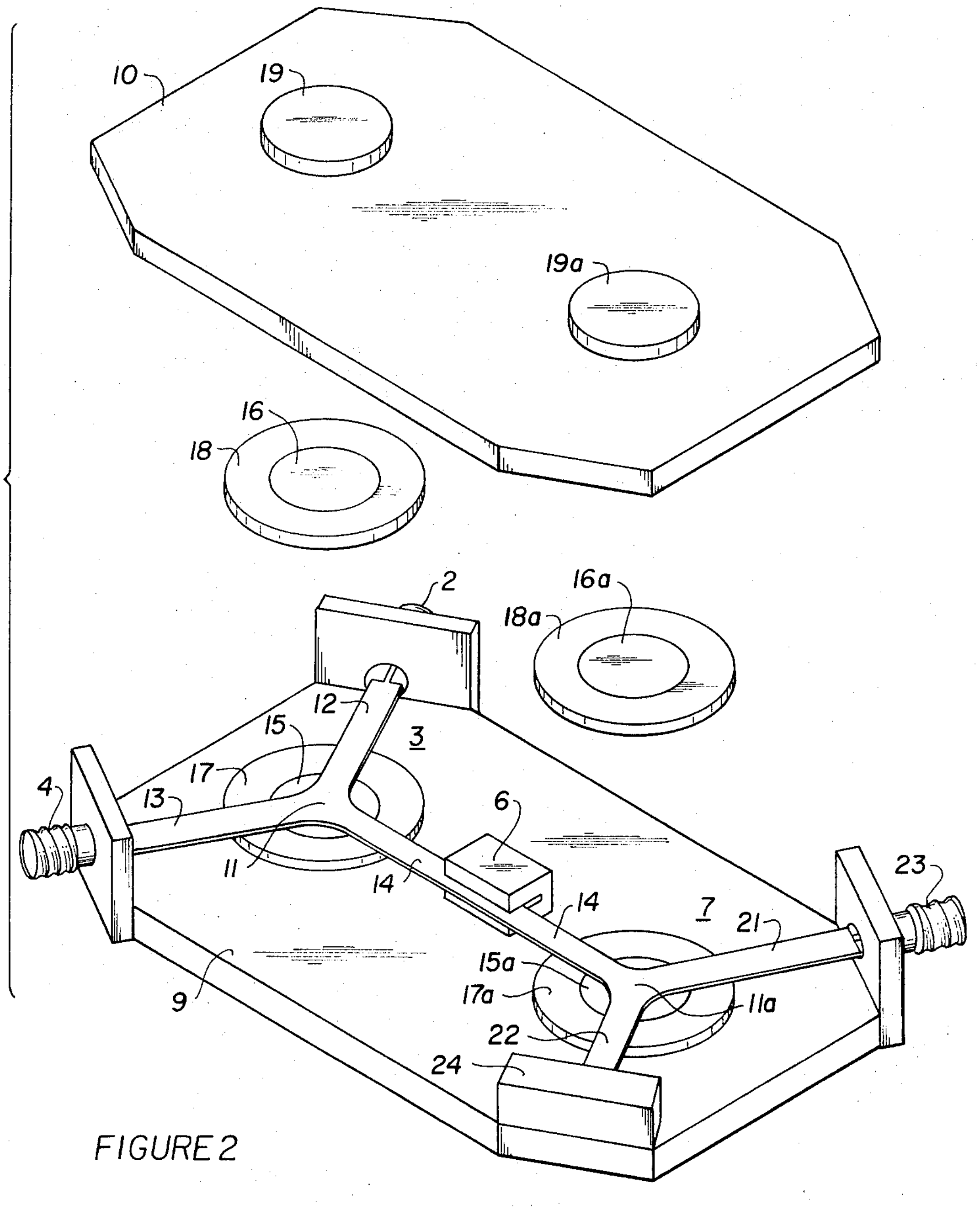
FIG. 2 is a pictorial representation of one presently preferred specific embodiment of the invention, partially disassembled to show internal details.

Referring to FIG. 2, the circulator 3, tuner 6 and isolator 7 are incorporated in an integrated structure using strip transmission line elements supported between ground planes 9 and 10.

The circulator 3 in this case comprises the Y - junction 11 formed by three conductive strips 12, 13 and 14, sandwiched between ferrite discs 15 and 16. The disc 16 and the upper ground plane 10 are shown removed and elevated from their assembled positions in the structure. The discs 15 and 16 are surrounded by rings 17 and 18 of dielectric material, designed to match the junction impedance to the line impedance. A permanent magnet 19 on the upper ground plane 10, together with a similar magnet, not shown, on the lower ground plane 9, provides the required bias field for the ferrite discs 15 and 16.

The strip conductors 12 and 13 extend from the junction 11 to the active device and input ports 2 and 4 respectively, shown as standard coaxial line fittings. Conductor 14 forms the output port 5 of circulator 3 and also the input port of the isolator 7 in the illustrative integrated structure.

The isolator 7 in this case is another circulator, similar to the circulator 3, comprising a junction 11*a* formed by conductor 14 and two further strip conductors 21 and 22. The ferrite discs 15*a* and 169, dielectric rings 17*a* and 18*a* and magnet 19*a* are similar to the corresponding parts of circulator 3. Conductor 21 extends to the coaxial fitting 23 adapted to be coupled to the load 8, not shown in FIG. 2. Conductor 22 extends to a dissipative termination device 24 comprising a body of lossy material supported between the ground planes 9 and 10.

The tuner 6 is a block of dielectric material, slotted as shown to accommodate a part of the conductor 14, and adjustable laterally and longitudinally of the conductor to provide the required impedance transformation between the isolator 7 and the circulator 3. After adjustment, the block may be secured in place by means such as adhesive cement. Other known tuning devices may be used instead of the dielectric block, if desired.

The operation of the apparatus of FIG. 2 is as described with reference to FIG. 1. Although the isolator 7 in this example is a single circulator junction, it will be understood that other types of isolator may be substituted, or additional circulator junctions may be added to it as necessary to provide the amount of isolator return loss required in the specific circumstances.

I claim:

1. A high isolation circulator arrangement for low noise single-port reflection type amplifiers, comprising:

a. a three port circulator having the first port connected as an input port, the second as a reflection amplifier port, and the third as an output port, b. means including a non-reciprocal transmission device for coupling said output port to a signal load, and c. means for matching the impedance looking into said non-reciprocal device to that of said output port.

2. The invention set forth in claim 1, wherein said non-reciprocal transmission device includes a second three-port circulator having an input port coupled to the output port of said first circulator, an output port adapted to be coupled to a singal load, and a terminated port coupled to a matching dissipative termination, and wherein said matching means comprises a tuning device coupled to the interjunction between said first and second circulators.

3. A high isolation circulator arrangement for low noise single-port reflection type amplifiers, comprising:

a. a first three port circulator having the first port connected as a input port, the second port as a reflection amplifier port and the third port as an output port, b. a second three port circulator having an input port, a termination port and an output port, c. interjunction coupling means between the output port of said first circulator and the input port of said second circulator, and d. impedance transformer means coupled to said interjunction coupling means for converting the impedance presented by the input port of said second circulator to an impedance that matches the output port of said first circulator for maximum isolation.

* * * * *